(12) United States Patent
Sarid et al.

(10) Patent No.: US 9,946,266 B2
(45) Date of Patent: Apr. 17, 2018

(54) CLASSIFICATION OF ENVIRONMENT ELEMENTS

(71) Applicant: ISRAEL AEROSPACE INDUSTRIES LTD., Lod (IL)

(72) Inventors: Shahar Sarid, Rehovot (IL); Tzvi Horowitz, Rosh Hayain (IL); Tal Siak, Tel Aviv (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 8 days.

(21) Appl. No.: 14/910,075

(22) PCT Filed: Aug. 7, 2014

(86) PCT No.: PCT/IL2014/050714
§ 371 (c)(1),
(2) Date: Feb. 4, 2016

(87) PCT Pub. No.: WO2015/019356
PCT Pub. Date: Feb. 12, 2015

(65) Prior Publication Data
US 2016/0179095 A1    Jun. 23, 2016

(30) Foreign Application Priority Data
Aug. 8, 2013   (IL) .......................................... 227860

(51) Int. Cl.
*G05D 1/02* (2006.01)
*G01C 21/00* (2006.01)
(Continued)

(52) U.S. Cl.
CPC ............ *G05D 1/0274* (2013.01); *G01C 3/08* (2013.01); *G01C 21/005* (2013.01);
(Continued)

(58) Field of Classification Search
CPC .. G05D 1/0274; G05D 1/0255; G05D 1/0257; G05D 1/0231; G05D 1/024; G05D 2201/0207; G01C 1/005; G01C 3/08; G01S 17/02; G01S 7/4802; G01S 17/89; G01S 17/936
See application file for complete search history.

(56) References Cited

U.S. PATENT DOCUMENTS

2014/0168440 A1   6/2014  Tsuchiya et al.

FOREIGN PATENT DOCUMENTS

WO   2013/038818   3/2013

OTHER PUBLICATIONS

Wulf, Oliver, Christian Brenneke, and Bernardo Wagner. "Colored 2D maps for robot navigation with 3D sensor data." Intelligent Robots and Systems, 2004.(IROS 2004). Proceedings. 2004 IEEE/RSJ International Conference on. vol. 3. IEEE, 2004.
(Continued)

*Primary Examiner* — Anne M Antonucci
(74) *Attorney, Agent, or Firm* — Dorsey & Whitney LLP

(57) ABSTRACT

The presently disclosed subject matter includes, inter alia, a method and a system which enables to classify information of a scanned outdoor or indoor environment to different types of environment elements. The identification of environment element types enables to improve detection of obstacles in an environment. The improved detection of obstacles can assist in motion planning to enable to advance quickly and safely through the environment.

18 Claims, 8 Drawing Sheets

(51) Int. Cl.
G01C 3/08 (2006.01)
G01S 17/02 (2006.01)
G01S 7/48 (2006.01)
G01S 17/89 (2006.01)
G01S 17/93 (2006.01)

(52) U.S. Cl.
CPC ............ *G01S 7/4802* (2013.01); *G01S 17/02* (2013.01); *G01S 17/89* (2013.01); *G05D 1/024* (2013.01); *G05D 1/0231* (2013.01); *G05D 1/0255* (2013.01); *G05D 1/0257* (2013.01); *G01S 17/936* (2013.01); *G05D 2201/0207* (2013.01)

(56) References Cited

OTHER PUBLICATIONS

Brovelli, M. A., M. Cannata, and U. M. Longoni. "Managing and processing LIDAR data within GRASS." Proceedings of the GRASS Users Conference. vol. 29. 2002.

Manduchi, Roberto, et al. "Obstacle detection and terrain classification for autonomous off-road navigation." Autonomous robots 18.1 (2005): 81-102.

Brovelli, M. A., & Cannata, M. (2004). Digital Terrain model reconstruction in urban areas from airborne laser scanning data: the method and an example for Pavia (Northern Italy). Computers & Geosciences, 30(4), 325-331.

CLASSIFICATION OF ENVIRONMENT ELEMENTS

FIELD OF THE PRESENTLY DISCLOSED SUBJECT MATTER

This invention relates to the field of classification of environment elements in a scanned environment.

BACKGROUND

One example of an application which can make use of the classification of environment elements identified in a given environment is motion planning (or path planning). Motion planning refers in general to the determination of a route from one location to another along a set of waypoints. Motion planning is used by various mobile platforms, including, autonomous platforms (e.g. robots or UGVs-unmanned ground vehicles) and non-autonomous platforms (including various types of driven vehicles). Motion planning enables quick and safe navigation of the platform through a desired indoor or outdoor environment, including being operable in both urban and non-urban (natural) surroundings.

When determining a route, motion planning algorithms use information with respect to obstacles which are located in the traversed area and provide instructions for circumventing the obstacles. Obstacles can include for example, water reservoirs, drops in terrain, walls, holes in the ground, big rocks or any other environment element that either blocks or endangers a platform attempting to pass through an area.

In some scenarios, motion planning is executed while the platform is advancing toward its destination. In such cases, different sensing devices are utilized for obtaining real-time information with respect to a surrounding area. This information is processed to determine whether obstacles are lying in the platform's pathway and enables to suggest alternative pathways in case obstacles are detected.

Publications considered to be relevant as background to the presently disclosed subject matter are listed below. Acknowledgement of the references herein is not to be inferred as meaning that these are in any way relevant to the patentability of the presently disclosed subject matter.

Colored 2D Maps for Robot Navigation with 3D Sensor Data, Oliver Wulf, Christian Brenneke, Bernardo Wagner, Institute for System Engineering, University of Hanover, Germany A navigation system for mobile service robots working in urban environments is disclosed. The system combines a 3D laser sensor with 2D algorithms for path planning and simultaneous localization and mapping (SLAM). In contrast to other map representations, the Colored 2D map is able to hold information adapted to both localization and path planning.

GENERAL DESCRIPTION

According to an aspect of the presently disclosed subject matter there is provided a method of classifying environment elements detected in a given environment to respective environment element types, the method comprising:

with the help of a processor performing at least the following operations:

obtaining information with respect to a plurality of scanned points in the given environment; the information comprising respective coordinates of each point;

identifying edges and non-edges from among the plurality of scanned points;

wherein a given scanned point is identified as an edge based on a difference between height of the given scanned point and height of adjacent scanned points;

dividing the plurality of scanned points into one or more clusters of scanned points; and classifying all scanned points in a given cluster as vegetation point candidates, if a portion of the identified edges from among the scanned points in the given cluster is greater than a given threshold value.

According to certain embodiments of the presently disclosed subject matter the method further comprises classifying a given edge from among the plurality of scanned points, which are not classified as vegetation point candidates, as an non-vegetation object point candidate, if a difference between height of the given edge and an adjacent scanned point is greater than a certain threshold value.

According to certain embodiments of the presently disclosed subject matter the method further comprises:

classifying a given non-edge scanned point located between two obstacle point candidates as non-vegetation object point candidates.

According to certain embodiments of the presently disclosed subject matter the dividing comprises:

shifting a sliding window over the plurality of scanned points, wherein each position of the sliding window generates a respective cluster of scanned points.

According to certain embodiments of the presently disclosed subject matter the plurality of scanned points are obtained during a plurality of scanning operations; the identifying, dividing and classification is performed individually for scanned points obtained in each scanning operation.

According to certain embodiments of the presently disclosed subject matter the method further comprises:

scanning the given environment with a scanner; determining the respective coordinates of each scanned point relative to a fixed reference frame.

According to certain embodiments of the presently disclosed subject matter the fixed reference frame is a global reference frame.

According to certain embodiments of the presently disclosed subject matter the method further comprises validating the vegetation point candidates and the non-vegetation object point candidates to obtain validated vegetation points, the validation comprising:

determining a value of at least one reflection feature of the vegetation point candidates and at least one reflection feature of the non-vegetation object point candidates;

validating the classification of the vegetation point candidate if a difference between the determined value of the at least one reflection feature and a respective expected value is smaller than a given threshold value;

validating the classification of the vegetation the non-vegetation object point candidates if a difference between the determined value of the at least one reflection feature and a respective expected value is smaller than a given threshold value.

According to certain embodiments of the presently disclosed subject matter the one or more reflection features include one or more of:

reflection beam width; variance of reflection beam width; and existence of secondary and tertiary reflections.

According to certain embodiments of the presently disclosed subject matter the identifying of one or more edges further comprises:

for a given scanned point i in a scanning operation:

determining a first difference between the height of the given point i and the height of an adjacent point i−1; determining a second difference between the height of the given point i and the height of an adjacent point i+1; identifying point i as an edge in case a third difference between the first difference and the second difference is greater than a given threshold value.

According to certain embodiments of the presently disclosed subject matter the method further comprises generating a grid map of the given environment, the grid map being divided into multiple cells, the generating comprising:

for each cell in the grid map:

aggregating multiple scanned points to the cell, wherein each point is classified to a certain type of environment elements; classifying the cell to a certain type of environment elements based on a classification of the multiple scanned points aggregated in the cell; and generating a grid map displaying in each cell information indicative of the respective type and height of an area in the environment which corresponds to the cell.

According to certain embodiments of the presently disclosed subject matter the method further comprises planning a motion path for advancing through the environment, based on the generated grid map.

According to another aspect of the presently disclosed subject matter there is provided a system configured for classifying environment elements detected in a given environment, the system comprising a processing unit comprising a computer memory operatively connected to at least one processor configured to:

obtain information with respect to a plurality of scanned points in the given environment; the information comprising respective coordinates of each point relative to a fixed reference frame; identify edges and non-edges from among the plurality of scanned points; wherein a given scanned point is identified as an edge based on a difference between height of the given scanned point and height of adjacent scanned points; divide the plurality scanned points into one or more clusters of scanned points; and classify all scanned points in a given group as vegetation point candidates, if a portion of the identified edges from among the scanned points in the given cluster is greater than a given threshold value.

According to another aspect of the presently disclosed subject matter there is provided a platform comprising: a scanner configured to scan the environment and obtain information with respect to a plurality of scanned points; a positioning device configured to obtain information with respect to location of the scanner with respect to a fixed reference frame; and a system configured for classifying environment elements detected in a given environment, the system comprising a processing unit comprising a computer memory operatively connected to at least one processor configured to:

obtain information with respect to a plurality of scanned points in the given environment; the information comprising respective coordinates of each point relative to a fixed reference frame; identify edges and non-edges from among the plurality of scanned points; wherein a given scanned point is identified as an edge based on a difference between height of the given scanned point and height of adjacent scanned points; divide the plurality scanned points into one or more clusters of scanned points; classify all scanned points in a given cluster as vegetation point candidates, if a portion of the identified edges from among the scanned points in the given cluster is greater than a given threshold value; and classify a given scanned point from among the plurality of scanned points, which are not classified as vegetation point candidates, as an non-vegetation object point candidate, if a difference between the given scanned point and an adjacent scanned point is greater than a certain threshold value.

According to another aspect of the presently disclosed subject matter there is provided a non-transitory program storage device readable by machine, tangibly embodying a program of instructions executable by the machine to perform a method of classifying environment elements detected in a given environment scanned by a scanner, the method comprising:

computer readable program code for causing the computer to obtain information with respect to a plurality of scanned points in the given environment; the information comprising respective coordinates of each point relative to a fixed reference frame;

computer readable program code for causing the computer to identify edges and non-edges from among the plurality of scanned points; wherein a given scanned point is identified as an edge based on a difference between height of the given scanned point and height of adjacent scanned points;

computer readable program code for causing the computer to divide the plurality of scanned points into one or more clusters of scanned points; and computer readable program code for causing the computer to classify all scanned points in a given cluster as vegetation point candidates, if a portion of the identified edges from among the scanned points in the given cluster is greater than a given threshold value.

According to another aspect of the presently disclosed subject matter there is provided a computer program product implemented on a non-transitory computer useable medium having computer readable program code embodied therein for classifying environment elements detected in a given environment, the computer program product comprising:

obtaining information with respect to a plurality of scanned points in the given environment; the information comprising respective coordinates of each point relative to a fixed reference frame;

identifying edges and non-edges from among the plurality of scanned points; wherein a given scanned point is identified as an edge based on a difference between height of the given scanned point and height of adjacent scanned points;

dividing the plurality scanned points into one or more clusters of scanned points; and classifying all scanned points in a given cluster as vegetation point candidates, if a portion of the identified edges from among the scanned points in the given cluster is greater than a given threshold value.

Additionally or alternatively to the above, the system, the platform, the computer program product and the computer storage device, disclosed in accordance with the presently disclosed subject matter can optionally comprise one or more of features of the embodiments listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
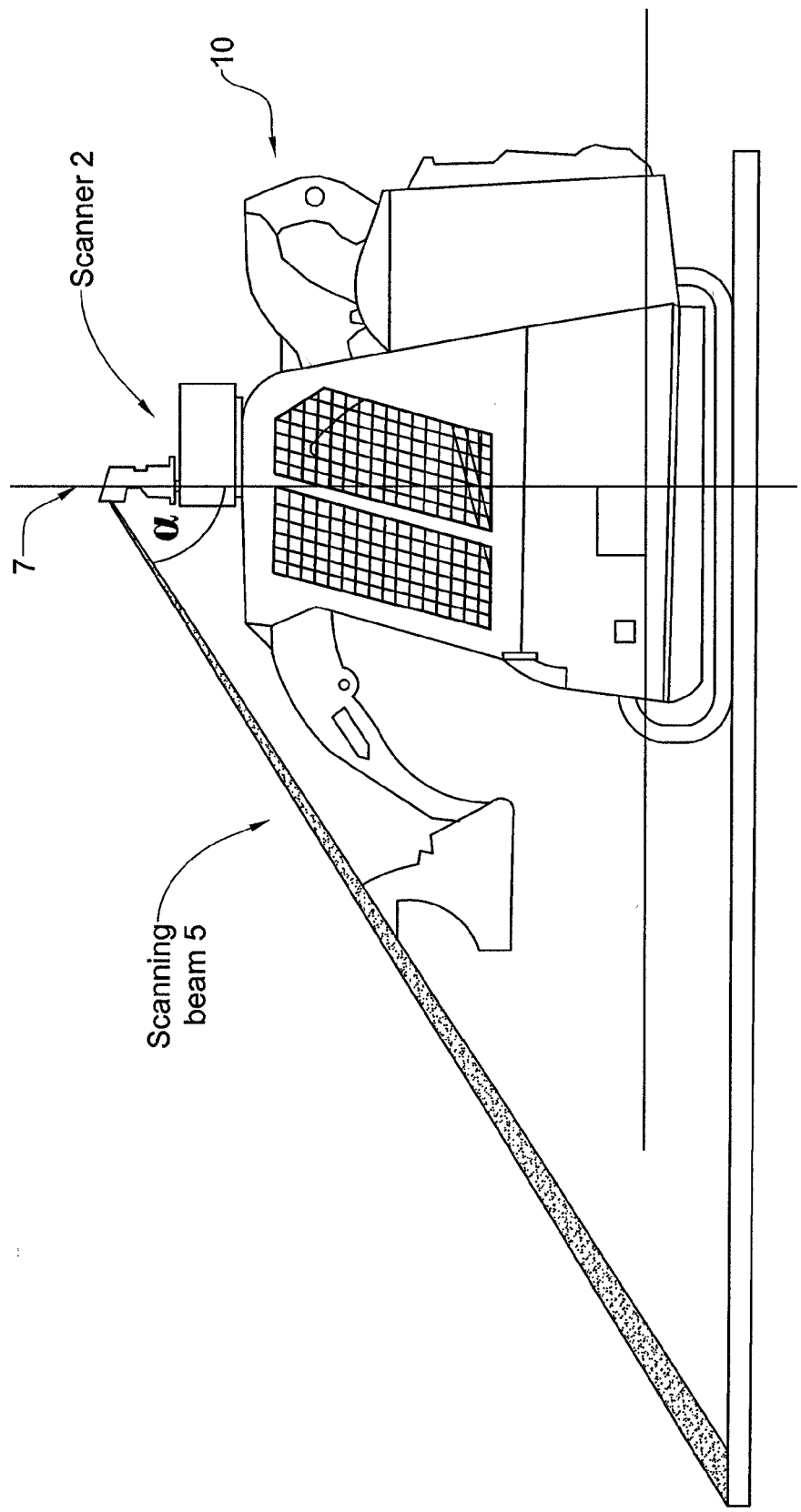
FIG. 1A is a schematic illustration of a side view of a UGV, in accordance with the presently disclosed subject matter.

In the drawings and descriptions set forth, where found appropriate identical reference numerals indicate those components that are common to different embodiments or configurations.

Unless specifically stated otherwise, as apparent from the following discussions, it is appreciated that throughout the specification discussions utilizing terms such as "obtaining", "identifying", "dividing", "classifying" or the like, include action and/or processes of a computer processor that manipulate and/or transform data into other data, said data represented as physical quantities, e.g. such as electronic quantities, and/or said data representing the physical objects.

Figure 2:
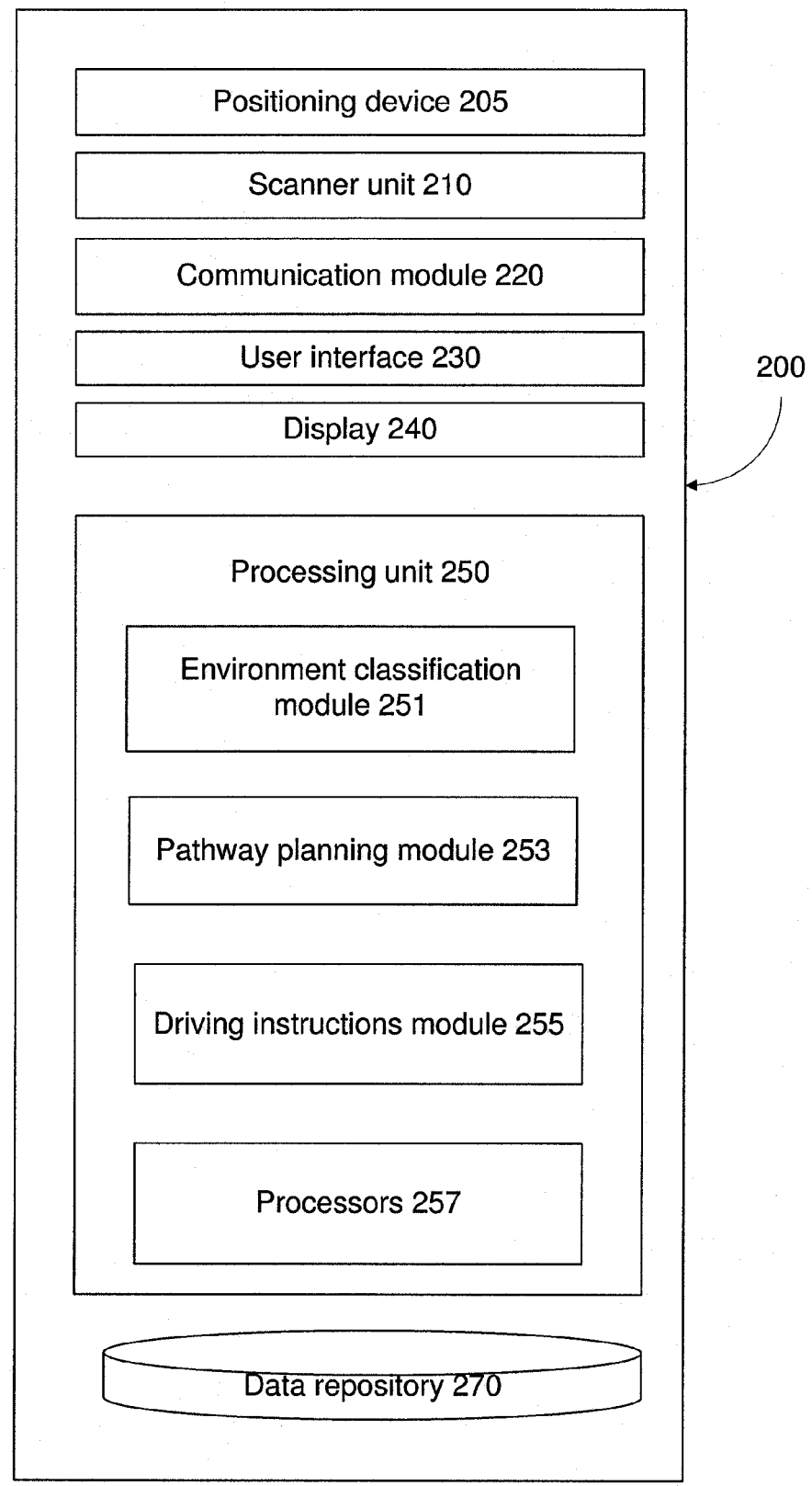
FIG. 2 is functional block diagram of a platform navigation system, in accordance with the presently disclosed subject matter.
Figure 3:
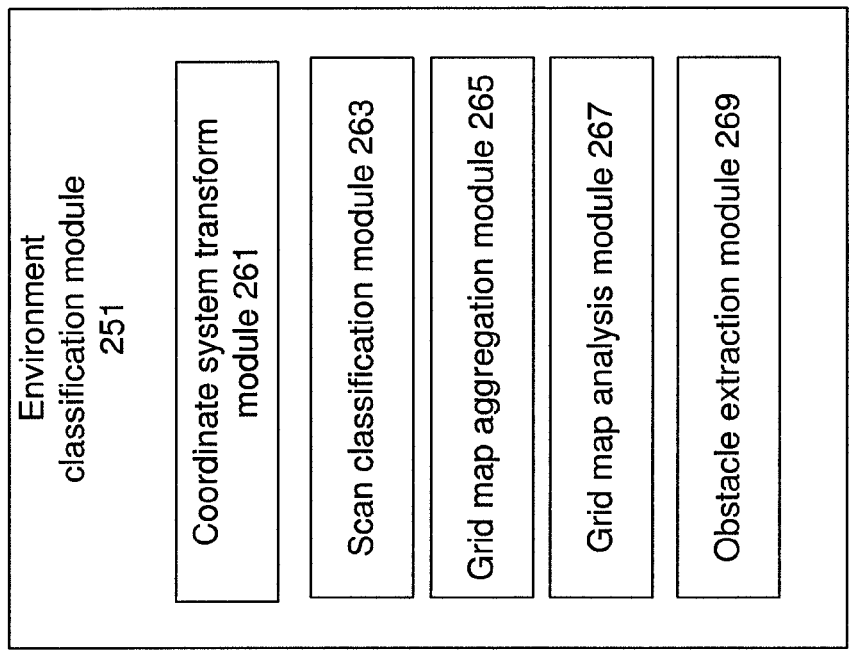
FIG. 3 is a functional block diagram of an environment classification module, in accordance with the presently disclosed subject matter.
Figure 5:
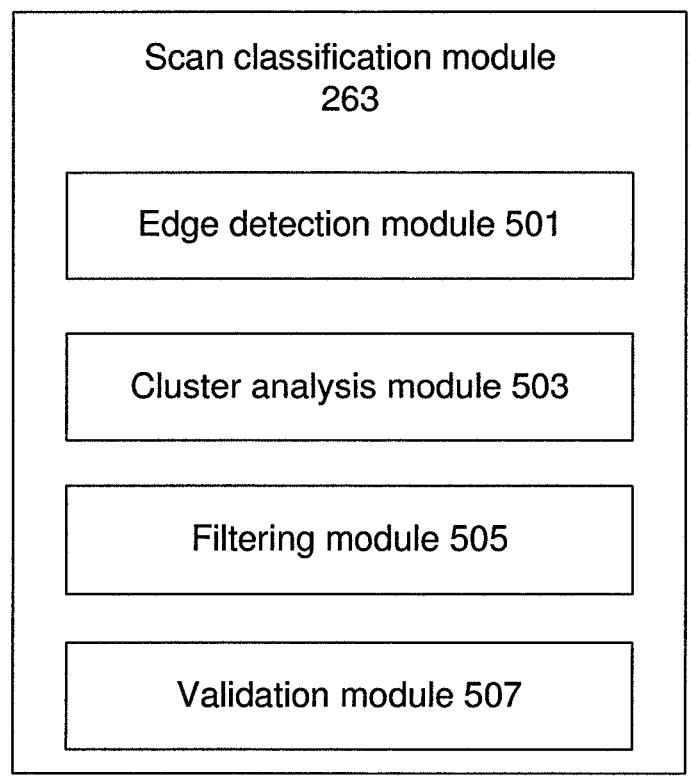
FIG. 5 is a functional block diagram of an example of a scan classification module, in accordance with the presently disclosed subject matter.

Platform navigation system 200 illustrated in FIG. 2 as well as environment classification module illustrated in FIG. 3 and scan classification module illustrated in FIG. 5 each comprise or is otherwise operatively connected to a non-transitory computer memory and one or more processors configured to execute the operation as disclosed herein. The term processor as used herein should be expansively construed to cover any kind of electronic device with suitable data processing capabilities, including, by way of non-limiting example, a personal computer, a server, a computing system, a communication device, a computer processor (e.g. digital signal processor (DSP), a microcontroller, a field programmable gate array (FPGA), an application specific integrated circuit (ASIC), etc.), any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 4:
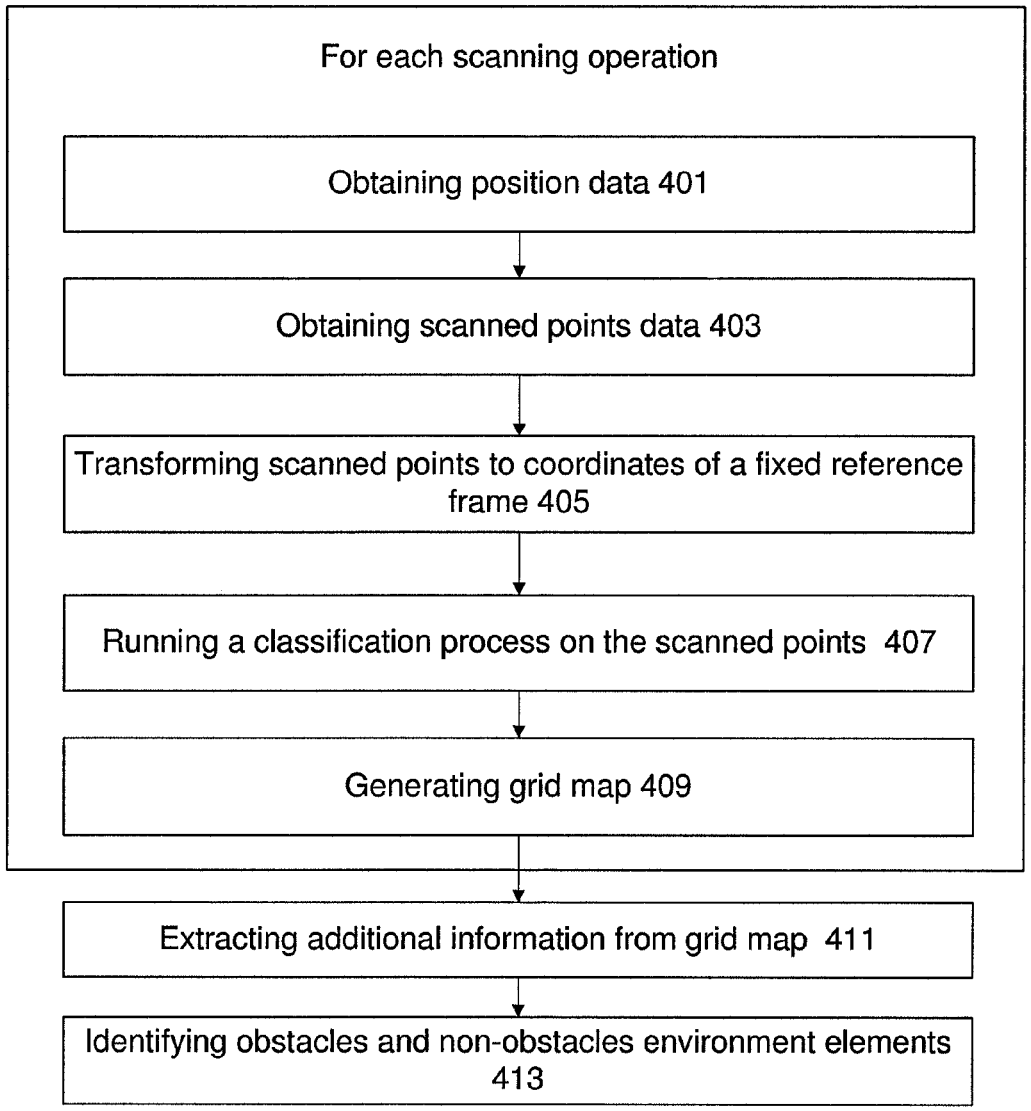
FIG. 4 is a flowchart exemplifying operations carried out, in accordance with the presently disclosed subject matter.
Figure 6:
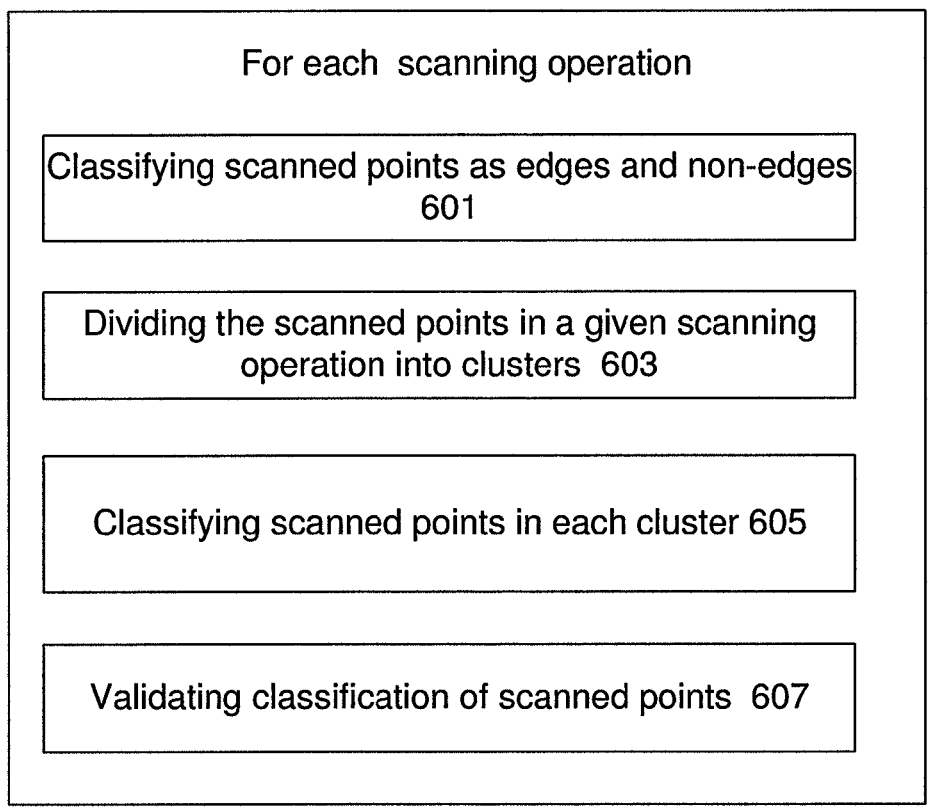
FIG. 6 is a flowchart exemplifying operations carried out, in accordance with the presently disclosed subject matter.

In embodiments of the presently disclosed subject matter, fewer, more and/or different stages than those shown in FIGS. 4 and 6 may be executed. In embodiments of the presently disclosed subject matter one or more stages illustrated in FIGS. 4 and 6 may be executed in a different order and/or one or more groups of stages may be executed simultaneously. FIGS. 2, 3 and 5 illustrate a general schematic of the system architecture in accordance with an embodiment of the presently disclosed subject matter. Modules in FIGS. 2, 3 and 5 can be made up of any combination of software and hardware and/or firmware that performs the functions as defined and explained herein. Modules in FIGS. 2, 3 and 5 may be centralized in one location or dispersed over more than one location. In other embodiments of the presently disclosed subject matter, the system may comprise fewer, more, and/or different modules than those shown in FIGS. 2, 3 and 5.

Bearing the above in mind attention is now brought to the description of the figures and various principles of the presently disclosed subject matter. Different tasks require the classification of environment elements into different environment element types. The environment element types include for example, ground surface, vegetation and non-vegetation. The non-vegetation type can include environment elements such as: solid objects (e.g. rocks, walls, buildings, vehicles, etc.) and landscape environment elements (e.g. drops in terrain, holes in the ground, etc.). As mentioned above, in order to enable a platform to quickly and safely advance through a desired area, environment elements are classified, enabling to identify obstacles which may block or endanger the platform.

In order to identify environment elements in a given environment, the area is scanned by a scanner and the information which is obtained by the scanner is processed. In case motion path planning is desired, once environment elements are classified, obstacles can be detected and a motion path which circumvents the detected obstacles can then be generated and used for navigating the platform through the area. Information with respect to a detected obstacle and the generated motion path can be provided as input for generating driving instructions to an autonomous platform. Alternatively or additionally, information with respect to a detected obstacle and the generated motion path can be provided to an operator of a semi-autonomous platform or to a driver/pilot of a non-autonomous platform in order to assist in driving the platform through the area.

One challenge involved in obstacle detection is related to the task of distinguishing between vegetation which is located in a traversed environment (an area which is being travelled or crossed) and other non-vegetation environment elements. Various types of vegetation (such as different types of small trees, bushes and tall weeds) are often characterized by size and outline that resemble the size and outline of other non-vegetation environment elements such as rocks, walls and rises in the ground such as knolls.

Thus, it is often difficult to determine whether information obtained during scanning of the environment is indicative of an actual obstacle which should be circumvented or vegetation which does not necessary require reconstruction of the motion path and can optionally be hit or overrun.

The presently disclosed subject matter includes, inter alia, a method and a system which enables to classify information of a scanned outdoor or indoor environment to different types of environment elements. The identification of environment element types enables to improve detection of obstacles in an environment. The improved detection of obstacles can assist in motion planning to enable to advance quickly and safely through the environment.

Attention is drawn to FIG. 1A showing a schematic illustration of a side view of a UGV, in accordance with the presently disclosed subject matter. It is noted that while in the following description principles of the presently disclosed subject matter are occasionally exemplified in the context of a UGV, this is done for the sake of simplicity and by way of non-limiting example only. The same principles can be similarly implemented in the context of other types of platforms (e.g. various types of robots, various types of semi-autonomous and non-autonomous platforms, including ground, marine and aerial vehicles).

FIG. 1A shows scanner 2 located on UGV 10. Scanner 2 can be located anywhere on vehicle 10 provided that it can scan a designated area around the UGV. For example, scanner 2 can be located on the roof of the UGV or on the hood of the UGV. In the example illustrated in FIG. 1A scanner 2 is configured for scanning the area located in front of the UGV. Scanner 2 is attached to UGV 10 in a fixed position creating a fixed angle α between scanning beam 5 and line 7 extending perpendicular to the horizontal plane of UGV 10. Scanner 2 can be any one of various types of range finding devices such as a pulse laser scanner, modulated continuous wave light source, radar, sonar range finder, etc.

UGV 10 further comprises a positioning device and a platform navigation system 200 which is described below in more detail. Platform navigation system 200 is operatively connected to the positioning device, to the scanner and optionally also to a driving assembly configured to drive/control the platform.

Figure 1B:
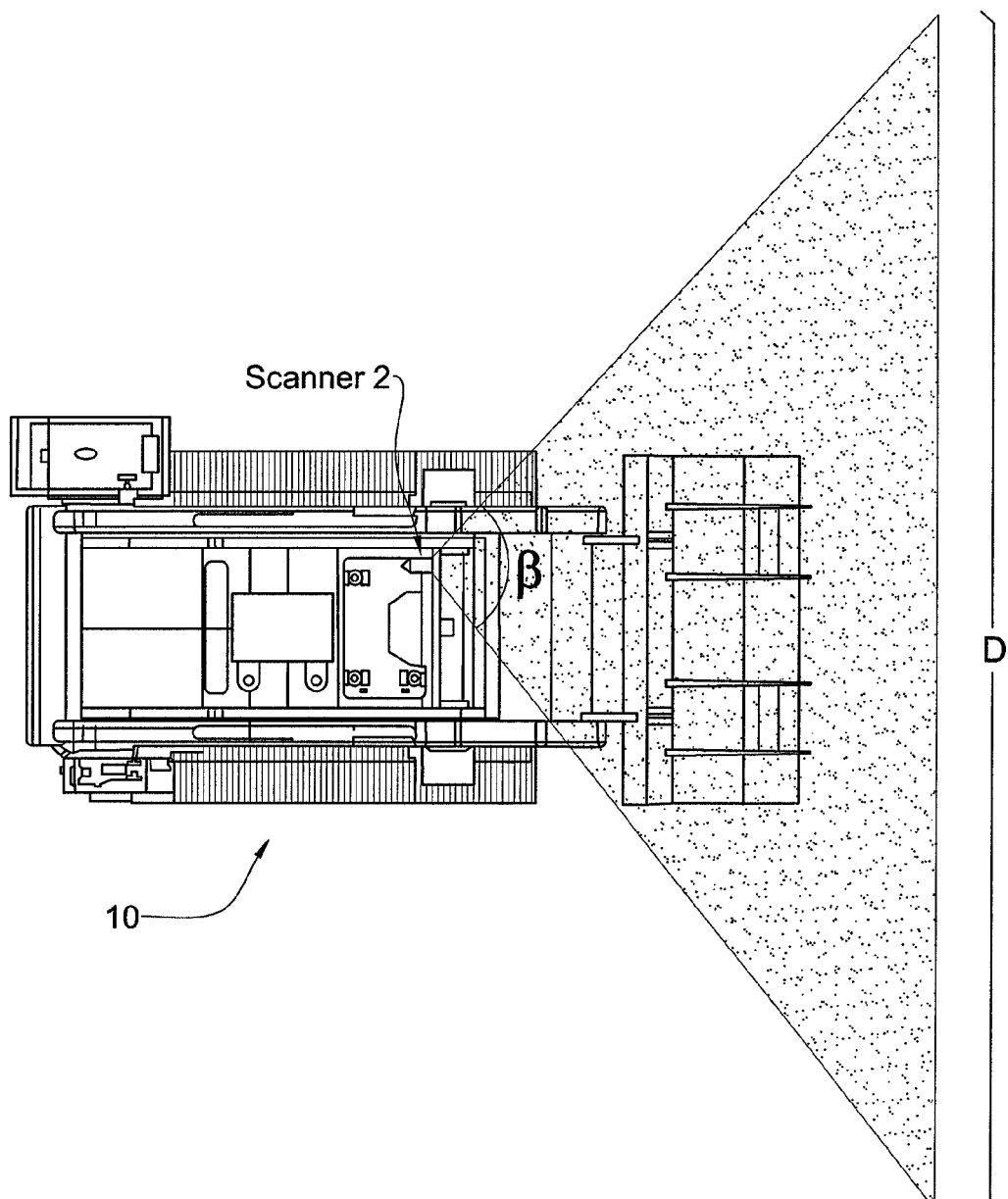
FIG. 1B is a schematic illustration of a top view of a UGV, in accordance with the presently disclosed subject matter.

FIG. 1B is a schematic illustration of a top view of UGV 10, in accordance with the presently disclosed subject matter. Scanner 2 is configured to continuously scan the area in front of the vehicle in a predefined field of view (indicated by angle β) enabling the coverage of a certain range D in each scanning operation. For instance a pulsed laser scanner can be configured to scan the surface in front of the UGV with discrete laser pulses in a lateral motion from left to right or right to left. Alternatively, a laser scanner can be configured with appropriate beam shaping optics configured to generate an optical laser screen capable of simultaneously scanning multiple points.

As UGV 10 advances, the surface in front of the UGV which comes into contact with the beam generated by scanner 2 (e.g. laser beam) is scanned. Each pulse (e.g. laser pulse) is reflected from a certain point in the scanned area and the reflection is detected by one or more detectors located on the UGV. Knowing, the location of the UGV (e.g. with the help of positioning device), the location of the scanner with respect to the UGV, and the distance of the point from the UGV (which can be calculated for example based on time of flight), three dimensional coordinates of each point can be determined Three dimensional coordinates can be determined relative to any fixed coordinate frame of reference including for example three dimensional global position.

FIG. 2 is a functional block diagram of a platform navigation system, in accordance with the presently disclosed subject matter. Platform navigation system 200 is configured inter alia, to provide information with respect to the classification of environment elements detected in a traversed environment. As explained below, platform navigation system 200 can also be configured to generate a grid map of the traversed environment. The grid map provides information with respect to the height and the location of different types of environment elements (including for example the position of vegetation and non-vegetation environment elements). The grid map can be for example a 2 dimensional height map (otherwise known as a 2.5 dimensional map).

Platform navigation system 200 can be assembled for example as a subsystem in a non-autonomous platform, semi-autonomous platform or autonomous platform (e.g. UGV or robot). Optionally, platform navigation system 200 can be distributed such that part of the functionalities of platform navigation system 200 are located remotely from the platform (e.g. at a remote control station). For example scanned information can be transmitted to a remote control station where the classification of the environment elements and generation of the grid map takes place or in another example only obstacle extraction may take place in a remote control station rather than on the platform. The result of the processing at the control station can be transmitted back to the platform and/or to some other entity (e.g. another platform travelling in the same environment).

Optionally, platform navigation system 200 can also be configured to generate a motion path for traversing the area as well as respective driving instructions to the platform. For example, in case of an autonomous platform, navigation system 200 can be configured to provide driving instructions to the platform based on a generated motion path. In case of a non-autonomous platform, navigation system 200 can be configured to provide driving instructions and/or warnings to a driver or remote operator of the platform (e.g. UGV 10).

Navigation system 200 can comprise for example, communication module 220, user interface 230, display 240 and processing unit 250. Navigation system can further comprise (or be operatively connected to) positioning device 205 and scanner unit 210.

Positioning device 205 can include a GPS and/or inertial measurement unit (IMU) or any other device configured to obtain positioning and orientation of the platform. Scanner unit 210 can comprise one or more scanners (such as scanner 2 described above) configured to scan the area in the area surrounding the platform and obtain scanned information which facilitates classification of environment elements and obstacle detection.

Communication module 220 is configured to enable communication between the different system components (sensing unit, processing unit, display etc.). Communication module 220 can be further configured to enable bidirectional communication between navigation system 200 and other remote systems. For example, communication module 220 can enable transmission of sensed information from the platform (e.g. UGV 10) to a remote control center and receive driving instructions from an operator located at the control center.

Processing unit 250 can comprise or be otherwise operatively connected to a persistent (non-transitory) computer memory and one or more processors 257 configured for executing operations in response to instructions as described herein. Processing unit 250 can comprise for example, environment classification module 251, pathway planning module 253, and driving instructions module 255.

Pathway planning module 253 is configured to determine a pathway for advancing the platform through the traversed environment. The pathway is generated based on different information which can include for example, the current location of the platform and the desired destination and the location of environment elements which are detected in the traversed environment. Environment elements can be classified as obstacles, which must be avoided and other environment elements (including vegetation) which can optionally be hit or overrun by the platform.

Information with respect to different types of environment elements which are detected in the traversed environment is provided to pathway planning module 253 by environment classification module 251 which is described in more detail below.

Driving instructions module 255 is configured to generate driving instructions in accordance with a generated pathway. Driving instructions can be transmitted for example to a driving assembly which is configured for driving the platform.

FIG. 3 is a functional block diagram depicting an example of an environment classification module 251, in accordance with the presently disclosed subject matter. Environment classification module 251 can comprise for example, coordinate system transform module 261, Scan classification module 263, grid map aggregation 265, grid map analysis module 267 and obstacle extraction module 269.

FIG. 4 is a flowchart exemplifying operations carried out in accordance with the presently disclosed subject matter. The operations in FIG. 4 are described herein, by way of non-limiting example only, with reference to environment classification module 251 illustrated in FIG. 3.

At block 401 information indicative of the position (and possibly orientation) of the platform is obtained. This information is provided with respect to some fixed reference frame and can be obtained for example by GPS and\or IMU devices located on a respective platform. At block 403 scanning data of a scanned area around the platform is obtained. To this end one or more scanners scan the area located around (e.g. in front of) the platform. Assuming for example that scanner 2 is located at the front part of the platform as illustrated in FIG. 1A, as the platform advances, new ground is being scanned and more information is gathered. Each beam (e.g. laser pulse) generated by scanner 2 returns a reflection from a point on the scanned surface. Depending on the specific technical features of scanner 2 it performs a scanning operation in a given field of view (indicated by angle $\beta$) returning a certain number of reflected points from the scanned range D. Thus, as used herein the term "scanning operation" is used to describe scanning of a range D.

For better accuracy, the location of the scanner can be deduced from the location of the platform and the relative location of the scanner with respect to the platform. Based on the specific features and configurations of the scanner, including for example value of angle $\alpha$ and a range of the scanned surface from the platform, three dimensional coordinates (x, y, z-latitude, longitude and height respectively) of each scanned point are determined (block 405). As mentioned above, the three dimensional coordinate system can be based on any fixed reference frame, including for example a global coordinate system. Transformation of scanned points to a three dimensional coordinate system can be performed for example by coordinate system transform module 261.

Scanned points of a given scanning operation which have been transformed into respective x, y, z coordinates, undergo a classification process into different environment elements types (block 407). Classification of scanned points can be performed for example by scan classification module 263.

As explained in more detail below with reference to FIGS. 5 and 6, during the classification process the scanned points are classified to at least one type of vegetation and one type of non-vegetation. Environment elements which are classified as non-vegetation can include various sub-types including for example any one of: ground level surface, solid objects and landscape elements located above average ground level (e.g. rocks, vehicles, walls, buildings, hills etc.), landscape elements located beneath the average ground level surface (e.g. holes, drops in terrain or any other recess in the ground level surface). For simplicity, environment elements which are not ground level surface and are not vegetation are referred herein as "non-vegetation objects" to differentiate them from non-vegetation environment elements which may also include ground level surface. After the scanned points are classified as vegetation and non-vegetation environment elements, the non-vegetation elements can be further classified into more specific sub-types.

At the end of the scanning and classification processes, each scanned point is associated with a respective x, y, z coordinate and a respective environment element type. This information can be stored in data-repository 270 (comprising for example persistent computer memory).

Information obtained during scanning and classification is aggregated in a grid map of the respective environment (block 409). The grid map is divided into cells of a given size. Each scanned point is projected into a respective cell in the grid map based on the location of the scanned point and a corresponding location of the cell. Multiple scanned points (obtained during multiple scanning operations) from two scanning dimensions are aggregated into the same cell. The first dimension is the widthwise dimension (e.g. left to right) scanned in a scanning operation. The second dimension is the dimension of the direction of advance of the platform (e.g. forward direction of the platform).

As mentioned above each scanned point is associated with a height parameter (z coordinate). The respective height of a given cell is calculated based on a statistical calculation which takes into account the heights of the scanned points aggregated to the same cell. According to one non-limiting example, the height of a given cell is determined based on the average of height of all scanned points aggregated to given cell. However, in some cases the average may skew the overall height value (e.g. where the variance of scanned points aggregated to a given cell is greater than a certain threshold) and additional/alternative methods, which are known per se, are used to determine a height value of cell in the grid map.

Based on the overall classification of all aggregated points in a given cell, the cell can be classified as well to a respective environment element type. As explained in more detail below, in some cases, classification of a scanned point may not be conclusive and ambiguity with respect to the classification of a given scanned point can be encountered. During the aggregation process, ambiguity with respect to the classification of scanned points can be resolved based on the overall classification of all points aggregated to a given cell.

Operations described above with reference to blocks 401 to 409 can be repeated for each scanning operation performed by the scanner. Aggregation of scanned points to a respective grid map cell can be performed for example by grid map aggregation module 265.

The generated grid map contains multiple cells, each cell being classified as vegetation and non-vegetation. As explained above, cells classified as non-vegetation may be further classified to more specific environment elements types (including ground level surface or other non-vegetation objects). The generated grid map (or at least part thereof) can be analysed and additional information with respect to environment elements located in the mapped environment can be extracted from the grid map (block 411). The additional information can include for example additional support for the classification of the cells into respective environment type elements. Grid map analysis can be performed for example by grid map analysis module 267.

Finally, the identified environment elements (in respective cells) can optionally be further classified to obstacles and non-obstacles (block 413). Obstacles are defined as non-traversable environment elements that have to be circumvented and cannot be overrun by the platform, and non-obstacles are defined as environment elements which can optionally be overrun or hit by the platform.

For example, height difference between cells which is greater than a certain threshold value may indicate drops or large objects such as boulders. Thus, based on height differences between cells in the grid map, additional information with respect to identified environment elements, can be determined. This information can assist in obstacles extraction. By determining the type and dimensions of detected environment elements, it is possible to determine whether these elements represent obstacles. For example, in case the height and width of a cell or a group of cells which are classified as non-vegetation is greater than a certain threshold (e.g. representing the expected size of a non-traversable environment element), the cells can be classified as obstacles.

Determination as whether a given object or landscape element is an obstacle or not, varies from one scenario to the next. The determination depends on various factors such as the traversability of the platform (ability of the platform to traverse a given terrain), whether vegetation can be overrun or not (e.g. whether the environment is a nature reserve in which destruction of surrounding vegetation should be avoided, and in which case vegetation is considered an obstacle), whether the driver/operator prefers to follow the main roads or not, etc. Therefore specific logic, which is adapted to the requirements and conditions of a specific scenario, can be used for this task. Obstacle extraction can be performed, for example, by obstacle extraction module 269.

The generated grid can be presented (e.g. on display 240) to an operator showing the classification and height of the outdoor environment. The generated grid can be also transmitted and displayed at other remote locations such as a display at a remote control center.

FIG. 5 is a functional block diagram of a more detailed example of scan classification module 263, in accordance with the presently disclosed subject matter. FIG. 6 is a flowchart exemplifying operations which are carried out, in accordance with the presently disclosed subject matter. The operations described in FIG. 6 are described, by way of non-limiting example only, with reference to scan classification module 263.

As mentioned above the scanned points in a scanning operation are transformed to respective x, y, z coordinates relative to some fixed reference frame. Information with respect to the scanned points and their respective coordinates is provided to scan classification module 263 (e.g. by coordinate transform module 261).

At block 601 the scanned points in a given scanning operation are processed and one or more edges are identified from among the scanned points. A given scanned point is identified as an edge based on a difference between height of the given scanned point and height of adjacent scanned points. To this end the calculation represented by equation 1 can be performed.

$$|(z_i - z_{i-1}) - (z_{i+1} - z_i)| > G_{threshold} \qquad \text{Equation 1:}$$

Wherein:

For each scanned point i a first difference between the height of the given point (z coordinate) and the height of the previous scanned point i−1 is calculated.

For each scanned point i a second difference between the height of the given point and the height of the next point i+1 is calculated.

Next a third difference between the first difference and the second difference is calculated and compared to a given threshold. In case the calculated value of the third difference is greater than the threshold value ($G_{threshold}$) point i is designated as an edge.

Classification of scanned points into edges and non-edge scanned points can be performed for example by edge detection module 501 in classification module 263.

Once edge and non-edge scanned points are identified from among scanned points of a given scanning operation, the scanned points of the given scanning operation are divided into clusters of scanned points (block 603). Clusters can be generated for example by shifting a sliding window of a given size over the scanned points of a given scanning operation. According to one example, the size of the sliding window can be selected relative to the expected average size of obstacles.

The scanned points in each cluster are then classified to different environment elements type (block 605).

Figure 7:
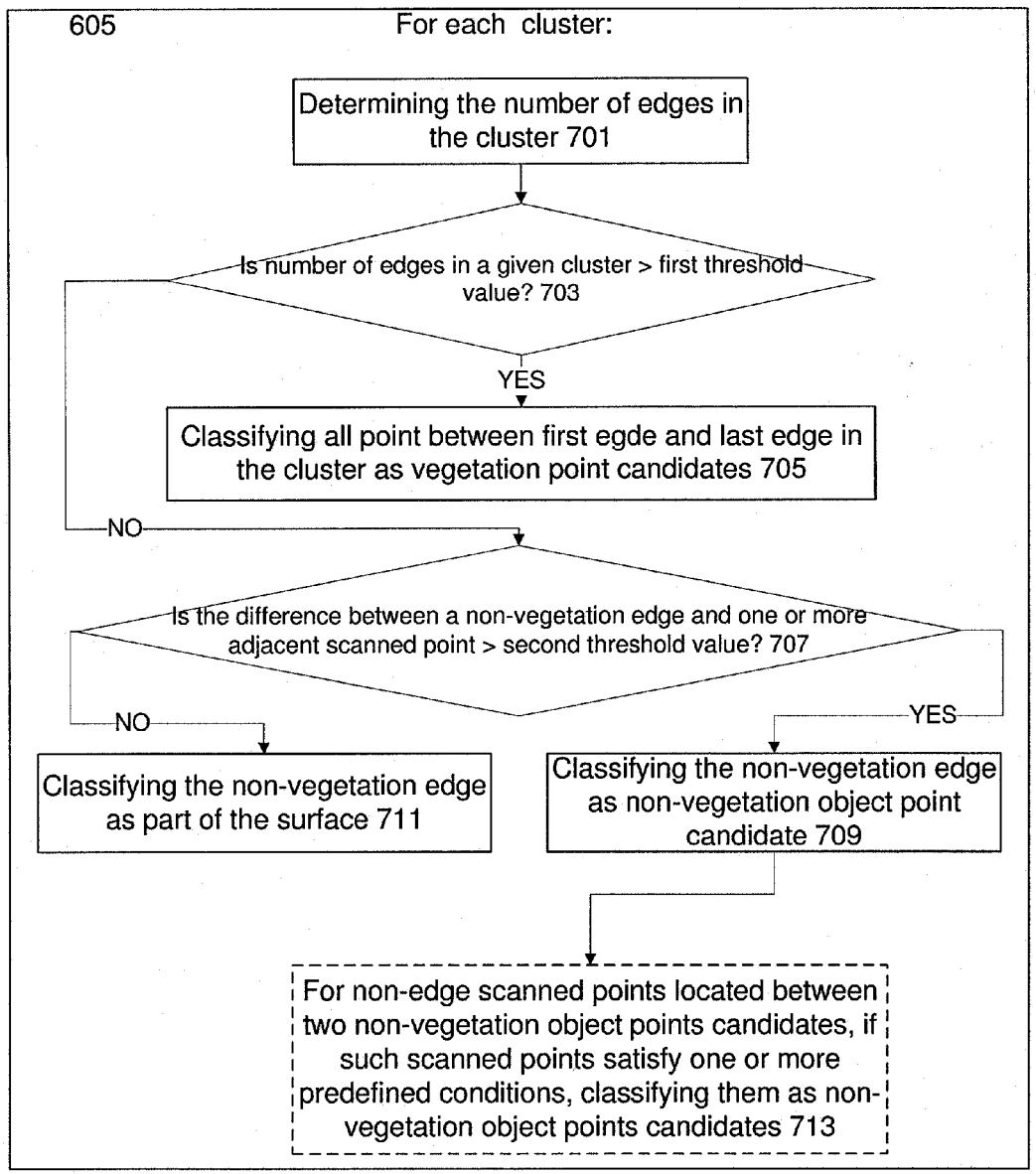
FIG. 7 is a flowchart showing an example of operation carried out during cluster classification, in accordance with the presently disclosed subject matter.

FIG. 7 is a flowchart showing an example of a sequence of operations carried during cluster classification, in accordance with the presently disclosed subject matter. The number of edges in each cluster (e.g. each position of the sliding window) is determined (block 701). At block 703 it is determined whether the number of edges in a cluster is greater than a certain threshold value (e.g. the number of scanned points in a sliding window divided by 2), and in case it is, all the scanned points in the cluster (or at least all scanned points between the first detected edge and the last detected edge in the cluster) are classified as candidate scanned points being reflected from vegetation (block 705). For the sake of simplicity, scanned points which are classified as candidate points being reflected from vegetation are referred to herein as "vegetation point candidates".

In case a sliding window is used, the same scanned point can appear in more than one window. Thus, according to one possible implementation, once a given scanned point is classified as a vegetation point candidate in a given window, the classification remains unchanged even if the same scanned point is classified otherwise in a different sliding window.

Scanned points in a given scanning operation which are designated as edges but are not classified as vegetation point candidates (e.g. in case the number of edges in a sliding window is less than a predefined threshold) are further processed in order to identify other types of environment elements, as described with reference to blocks 707 to 713 below.

For example, in case the difference (in height) between a non-vegetation edge (i.e. edges not classified as vegetation point candidates) and adjacent one or more scanned points is greater than a given threshold value, the edges are classified as candidates being reflected from a non-vegetation object, referred to herein for simplicity as "non-vegetation object point candidates" (block 709). Such edges may represent an environment element rising above ground level (e.g. rock, wall or a rise in the ground) or an environment element descending beneath ground level (e.g. hole or drop). This depends on the relative height of the edge with respect to the adjacent scanned points. Otherwise, (at block 711) the edges are classified as part of the surface of the landscape (characterized by substantially the average ground level height). The threshold value can be determined for example based on the height of the edges with respect to average ground level.

Optimally, non-edge scanned points located between two non-vegetation object points candidates can also be classified as non-vegetation object point candidates (block 713). Optionally this can be done if the non-edge scanned points satisfy one or more predefined conditions. For example, the condition can be a predefined height of the non-edge scanned point relative to the two obstacle point candidates and/or a predefined range covered by the non-edge scanned points. In such case an environment element can be identified and classified as a non-vegetation object candidate starting from one edge (classified as a non-vegetation object point candidate) to the next edge (classified as a non-vegetation object point candidates). For example, a rock rising above the ground can be identified by edges marking it on its two sides and a sequence of non-edge scanned points located in between, and characterized by substantially the same height as the edge points.

Operations described with reference to blocks 603 and 605 can be performed for example by cluster analysis module 503.

Next, the scanned points (in a given scanning operation-after all scanned points in all clusters have been classified) are divided into groups of scanned points each comprising scanned points of the same type; adjacent vegetation point candidates are grouped together into a first group, non-vegetation object point candidates are grouped together into a second group, and ground surface level scanned points (being neither vegetation point candidates nor non-vegetation object point candidates) are grouped together into a third group.

Scanned points in each group undergo further processing in order to validate their classification (block 607). The validation includes analysis of various reflection features and comparing the features to the expected features of a scanned point generated by a respective signal (e.g. laser signal) reflected off a given environment element.

The reflection features can include for example one or more of the following:

1. Pulse reflection width—a beam (e.g. laser pulse) which is reflected from vegetation is often characterized by a certain width which is different than the reflection off other objects. The pulse width varies depending on the characteristic of the laser and the roughness of the reflecting object.

2. Variance in pulse reflection width within a group of scanned points—groups of scanned points reflected from a given type of environment elements are characterized by an expected variance of the pulse reflection width. Thus, the variance of a group of scanned points can be used for assisting in the validation of the classification of the scanned points.

3. Secondary and tertiary reflections which are typical of certain objects—for example, when a laser beam hits vegetation part of the beam is reflected from the surface of a vegetation and part of the beam continues and "penetrates" the vegetation and hits the ground. The part which hits the ground generates a secondary reflection. Tertiary reflections can be further generated for example, when different parts of the laser are reflected from different parts of a plant located at different distances.

It is noted that feature 1 is a characteristic of a single scanned point and feature 2 and 3 are characteristics of a group of scanned points.

It is further noted that other reflection features can be used depending on the specific type of scanner in addition to or instead of the ones exemplified above. Each classified scanned point or group of points can be associated with a classification reliability parameter according to the matching of the reflection features with the features expected from a spot reflected off vegetation respective environment element type.

If the vegetation point candidates (in a given group) are characterized by reflection features which match the reflection features of a laser spot reflected from vegetation, the classification of the vegetation point candidates is validated. If the non-vegetation object point candidates (in a given group) are characterized by reflection features which match the reflection features of a laser spot reflected from a respective environment element, the classification of the non-vegetation object point candidates is validated.

After validation, vegetation and obstacle point candidates are classified as validated scanned points. Otherwise, classification of the vegetation point candidates is cancelled. Validation can be performed for example, by validation module 507.

The validation of non-vegetation object and vegetation point candidates as described above can be followed by additional validation which is performed based on the cell aggregation in the grid map.

The classified points in each scanning operation are aggregated to a respective cell in a grid map. The grid map shows the classification of the map cells into different environment element types. Each cell is also characterized by a given height. Based on the overall classification of the scanned points in a cell, the entire cell can be classified. Thus, a grid map cell which comprises a certain portion of validated vegetation scanned points is classified as a cell representing vegetation. A grid map cell which comprises a certain portion of validated non-vegetation object scanned points is classified as a cell representing a non-vegetation object and the same is for a cell comprising scanned points which comprises scanned points which are classified as surface. Each type of cell is displayed in accordance with its classification (e.g. color in a designated color).

Furthermore, as mentioned above, classification of the cells in a grid map into different environment element types enables to resolve ambiguities in the classification process. For example, the validation process may provide inconclusive results when part of the features match the expected features of a scanned point reflected from vegetation, and part of the features do not. The ambiguity of such scanned points can be resolved based on the classification of the cell to which such points are projected (which can be based in turn on the type of the majority of scanned points which are aggregated to the same cell).

The grid map can be displayed to a driver or operator of a platform in order to enable navigation of the platform through the mapped environment. The grid map can also be made available to a motion planning module for automatically generating a motion path that avoids obstacles that can put the UGV at risk.

Furthermore, final identification of vegetation and non-vegetation objects as obstacles in a given environment is dependent on specific decision logic, which is adapted to the requirements and conditions of a specific scenario, as explained above. As explained above with reference to block 413 in FIG. 4 and obstacle extraction module 269 in FIG. 3, vegetation and non-vegetation scanned points which are aggregated to the grid map are designated as actual obstacles based on specific decision logic which is adapted to the requirements and conditions of a specific scenario.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A method of classifying environment elements detected in a given environment to respective environment element types, the method comprising:
    scanning the given environment with one or more scanners to obtain scanned points in the given environment; and
    with the help of a processor performing at least the following operations:
        determining information with respect to a plurality of the scanned points; the information comprising respective coordinates of each point relative to a fixed reference frame;
        identifying edges and non-edges from among the plurality of scanned points;
    wherein the identifying comprises:
        for a given scanned point i in a scanning operation:
            determining a first difference between height of the given point i and height of an adjacent point i−1;
            determining a second difference between height of the given point i and height of an adjacent point i+1;
            identifying point i as an edge in case a third difference between the first difference and the second difference is greater than a given threshold value;
        dividing the plurality scanned points into one or more clusters of scanned points; and
        classifying all scanned points in a given cluster as vegetation point candidates, if a portion of the identified edges from among the scanned points in the given cluster is greater than a given threshold value.

2. The method according to claim 1 further comprising:
    classifying a given edge from among the plurality of scanned points, which are not classified as vegetation point candidates, as an non-vegetation object point candidate, if a difference of height between the given edge and an adjacent scanned point is greater than a certain threshold value.

3. The method according to claim 1 further comprising:
    classifying a given non-edge scanned point located between two obstacle point candidates as non-vegetation object point candidates.

4. The method according to claim 1 wherein the dividing comprises:
    shifting a sliding window over the plurality of scanned points, wherein each position of the sliding window generates a respective cluster of scanned points.

5. The method according to claim 1 wherein the plurality of scanned points are obtained during a plurality of scanning operations; the identifying, dividing and classification is performed individually for scanned points obtained in each scanning operation.

6. The method according to claim 1 further comprising validating the vegetation point candidates to obtain validated vegetation points, the validation comprising:
    determining a value of at least one reflection feature of the vegetation point candidates; and
    validating the classification of the vegetation point candidates if a difference between the determined value of the at least one reflection feature and a respective expected value is smaller than a given threshold value.

7. The method according to claim 1, further comprising:
    generating a grid map of the given environment, the grid map being divided into multiple cells, the generating comprising:
    for each cell in the grid map:
    aggregating multiple scanned points to the cell, wherein each point is classified to a certain type of environment elements;
    classifying the cell to a certain type of environment elements based on a classification of the multiple scanned points aggregated in the cell; and
    generating a grid map displaying in each cell information indicative of the respective type and height of an area in the environment which corresponds to the cell.

8. The method according to claim 7, further comprising generating driving instructions for controlling a platform, while traversing the given environment.

9. A system configured for classifying environment elements detected in a given environment, the system comprises or is otherwise operatively connected to at least one scanner, the at least one scanner is configured to scan the given environment and obtain information with respect to scanned points;
    the system further comprises a processing unit comprising a computer memory operatively connected to at least one processor configured to:
    determine information with respect to a plurality of scanned points in the given environment; the information comprising respective coordinates of each point relative to a fixed reference frame;
    identify edges and non-edges from among the plurality of scanned points;
    wherein the at least one processor is configured for identifying to:
    for a given scanned point i in a scanning operation:
        determine a first difference between height of the given point i and height of an adjacent point i−1;
        determine a second difference between height of the given point i and height of an adjacent point i+1;

identify point i as an edge in case a third difference between the first difference and the second difference is greater than a given threshold value;

divide the plurality scanned points into one or more clusters of scanned points; and classify all scanned points in a given group as vegetation point candidates, if a portion of the identified edges from among the scanned points in the given cluster is greater than a given threshold value.

10. The system according to claim 9 wherein the at least one processor is further configured to classify a given edge from among the plurality of scanned points, which are not classified as vegetation point candidates, as an non-vegetation object point candidate, if a difference of height between the given edge and an adjacent scanned point is greater than a certain threshold value.

11. The system according to claim 9 wherein the at least one processor is further configured to classify a given non-edge scanned point located between two non-vegetation object point candidates as non-vegetation object point candidates.

12. The system according to claim 9 wherein the at least one processor is configured to shift a sliding window over the plurality of scanned points, wherein each position of the sliding window generates a respective cluster of scanned points.

13. The system according to claim 9 wherein the plurality of scanned points are obtained during a plurality of scanning operations; the processing unit is configured to perform the identifying, dividing and classification for scanned points obtained in each scanning operation, individually.

14. The system according to claim 9 wherein the at least one processor is further configured to validate the vegetation point candidates to obtain validated vegetation points, the validation comprising:

determining a value of at least one reflection feature of the vegetation point candidates and at least one reflection feature of the non-vegetation object point candidates;

validating the classification of the vegetation point candidate and the non-vegetation object point candidates in case a difference between the determined value of the at least one reflection feature and a respective expected value is smaller than a given threshold value.

15. The system according to claim 9 wherein the processing unit further comprises a grid map aggregation module configured with instructions to enable the processor to generate a grid map of the environment, the grid map being divided into multiple cells, the at least one processor being further configured to:

generate a grid map of the environment, the grid map being divided into multiple cells, the generating comprising:

for each cell in the grid map:

aggregating multiple scanned points to the cell, wherein each point is classified to a certain type of environment elements;

classifying the cell to a certain type of environment elements based on a classification of the multiple scanned points aggregated in the cell; and generating a grid map displaying in each cell information indicative of the respective type and height of an area in the environment which corresponds to the cell.

16. The system according to claim 15 is further configured to generate instructions for controlling a platform while traversing the given environment.

17. A platform comprising:

a scanner configured to scan the environment and obtain information with respect to scanned points;

a positioning device configured to obtain information with respect to location of the scanner with respect to a fixed reference frame; and a system configured for classifying environment elements detected in a given environment, the system comprises a processing unit comprising a computer memory operatively connected to at least one processor configured to:

obtain information with respect to a plurality of scanned points in the given environment;

the information comprising respective coordinates of each point relative to a fixed reference frame;

identify edges and non-edges from among the plurality of scanned points; wherein the at least one processor is configured for identifying to:

for a given scanned point i in a scanning operation:

determine a first difference between height of the given point i and height of an adjacent point i−1;

determine a second difference between height of the given point i and height of an adjacent point i+1;

identify point i as an edge in case a third difference between the first difference and the second difference is greater than a given threshold value;

divide the plurality scanned points into one or more clusters of scanned points;

classify all scanned points in a given cluster as vegetation point candidates, if a portion of the identified edges from among the scanned points in the given cluster is greater than a given threshold value; and classify a given scanned point from among the plurality of scanned points, which are not classified as vegetation point candidates, as an non-vegetation object point candidate, if a difference between the given scanned point and an adjacent scanned point is greater than a certain threshold value.

18. A non-transitory program storage device readable by machine, tangibly embodying a program of instructions executable by the machine to perform a method of classifying environment elements detected in a given environment scanned by a scanner, the method comprising:

computer readable program code for causing the computer to obtain information with respect to a plurality of scanned points in the given environment, which were obtained by the scanner scanning the given environment; the information comprising respective coordinates of each point relative to a fixed reference frame;

computer readable program code for causing the computer to identify edges and non-edges from among the plurality of scanned points; the identifying of edges and non-edges comprises:

for a given scanned point i in a scanning operation:

determining a first difference between height of the given point i and height of an adjacent point i−1;

determining a second difference between height of the given point i and height of an adjacent point i+1;

identifying point i as an edge in case a third difference between the first difference and the second difference is greater than a given threshold value;

computer readable program code for causing the computer to divide the plurality of scanned points into one or more clusters of scanned points; and computer readable program code for causing the computer to classify all scanned points in a given cluster as vegetation point candidates, if a portion of the identified edges from among the scanned points in the given cluster is greater than a given threshold value.

* * * * *